3,107,993
CONTROLLING THE GROWTH OF
AQUATIC WEEDS
Benjamin B. Schaeffer, New Haven, and Mason C. Blaich, Cheshire, Conn., assignors to Olin Mathieson Chemical Corporation, a corporation of Virginia
No Drawing. Filed Oct. 31, 1961, Ser. No. 148,812
3 Claims. (Cl. 71—2.3)

The present invention resides in the method of controlling the growth of aquatic weeds by applying thereto a composition containing 2,4,5-trichlorophenoxyethoxyethanol as the essential active ingredient.

Aquatic or semi-aquatic weeds have received little attention in weed control research programs. These weeds are becoming increasingly important as agricultural pests in all parts of the country. Aquatic weeds spread rapidly throughout irrigation and drainage systems as well as along rivers and in lakes and ponds.

It is, therefore, an object of the present invention to provide an effective method for the control of aquatic weeds.

It is a further object of the present invention to provide a method for the control of aquatic weeds which does not have an adverse effect on fish.

A still further object of the present invention is to provide a method for the control of aquatic weeds which method utilizes a small quantity of active ingredients yet still providing high level of control.

Further objects and advantages will appear hereinafter.

In accordance with the present invention it has now been found that the growth of aquatic weeds may be controlled by applying thereto 2,4,5-trichlorophenoxyethoxyethanol or a composition containing 2,4,5-trichlorophenoxyethoxyethanol as the essential active ingredient.

The process of the present invention will be more readily apparent from a consideration of the following examples.

EXAMPLE 1.—PREPARATION OF 2,4,5-TRICHLOROPHENOXYETHOXYETHANOL

Three moles of 1,2,4,5-tetrachlorobenzene, 7.5 moles of sodium hydroxide and 2400 grams of diethylene glycol were heated with stirring for 6 hours at 125° C. At the end of this period the crude product in the form of a dark-brown oil was distilled under reduced pressure. 2,4,5-trichlorophenoxyethoxyethanol was recovered in an 84% yield based on the starting weight of 1,2,4,5-tetrachlorobenzene.

EXAMPLE 2.—2,4,5-TRICHLOROPHENOXYETHOXYETHANOL AS AN AQUATIC HERBICIDE 2,4,5-trichlorophenoxyethoxyethanol was applied to the chosen aquatic plant as a dilute aqueous solution in a concentration of 5 parts per million. 4 to 6 inch cuttings of the aquatic plant were placed in a one gallon glass jar with dechlorinated tap water. The jars were tightly covered to prevent evaporation and contamination of the water. The planted jars were illuminated by cool, white, thin-line fluorescent lamps. The intensity of the illumination of the water surface was from 60 to 100 foot candles. The plants were illuminated for 10 hours each day from 8 a.m. to 6 p.m. The plants were allowed to remain in the jars for a conditioning period of 3 weeks during which time fertilizer was periodically added to the jar. At the end of this time the jars were checked to be sure that the plants were vigorously growing. Any jar with discolored or dead plants was discarded from further use.

An aqueous solution containing 5 parts per million of 2,4,5-trichlorophenoxyethoxyethanol was then added to the jars and the jars immediately tightly sealed. The jars were then maintained under the same conditions for an additional 3 weeks as during the 3 week conditioning period. At the end of this test period the effects of the chemicals applied were evaluated. The results are summarized in the following table in which species of the test plant was evaluated in three separate tests and the average for the three tests given. Evaluation of herbicidal effects for each chemical on each species of plant is by visual observation. The plant injury ratings range from 1 (no visible effect) to 10 (a dead plant). Ratings from 1–3 indicate very slight herbicidal activity, from 4–6 indicate moderate herbicidal activity and from 7–9 indicate definite to severe herbicidal activity. Two investigators made independent ratings on each species of plant. These ratings were then averaged for the two investigators and three replications are expressed as percent herbicidal effectiveness for each species.

Table I

| Plant | Test 1 | Test 2 | Test 3 | Percent Herbicidal Effectiveness |
|---|---|---|---|---|
| Pithophora | 4 | 4 | 3.5 | 38 |
| Najas | 5 | 10 | 10 | 83 |
| Potamogeton | 10 | 10 | 10 | 100 |
| Water Star-Grass | 10 | 10 | 10 | 100 |
| Elodea | 7 | 8.5 | 10 | 85 |
| Overall | | | | 81 |

The following example is given for comparative purposes and represents the effectiveness of 2,4,5-trichlorophenoxyethoxyethoxyethanol. This compound is prepared by reacting 1,2,4,5-tetrachlorobenzene with triethylene glycol in a manner after Example 1.

EXAMPLE 3

Example 2 was repeated with the exception that 2,4,5-trichlorophenoxyethoxyethoxyethanol was substituted for 2,4,5-trichlorophenoxyethoxyethanol.

Table 2

| Plant | Test 1 | Test 2 | Test 3 | Percent Herbicidal Effectiveness |
|---|---|---|---|---|
| Pithophora | 3 | 3 | 3 | 30 |
| Najas | 5.5 | 4.5 | 5 | 50 |
| Potamogeton | 6 | 5 | 6 | 57 |
| Water Star-Grass | 6 | 6 | 5.5 | 58 |
| Elodea | 5.5 | 6 | 6 | 58 |
| Overall | | | | 51 |

In the process of the present invention a growth inhibiting quantity of a composition containing 2,4,5-trichlorophenoxyethoxyethanol as the essential active ingredient is applied to the media to be treated. 2,4,5-trichlorophenoxyethoxyethanol is preferably applied to the desired aquatic weed in a concentration of at least 1 part per million. More concentrated solutions may, of course, be used; however, for practical considerations, a more dilute solution is preferred. Any of the inert carriers known to the art may be employed, with aqueous solutions being especially preferred. In addition, the compound may be applied directly to the aquatic media in the solid form in a manner known to the art.

The compound of the present invention was surprisingly effective in inhibiting the growth of aquatic weeds. Further, when the compound of the present invention was applied to a pond in an aqueous solution in a concentration of 100 parts per million no visible damage to the fish resulted.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. The method of controlling the growth of aquatic weeds which comprises applying thereto a growth inhibiting quantity of 2,4,5-trichlorophenoxyethoxyethanol in a concentration of at least 1 part per million.

2. The method of controlling the growth of aquatic weeds which comprises applying thereto a growth inhibiting quantity of a composition containing 2,4,5-trichlorophenoxyethoxyethanol as the essential active ingredient in a concentration of at least 1 part per million.

3. The method of controlling the growth of aquatic weeds which comprises applying thereto a growth inhibiting quantity of an aqueous composition containing 2,4,5-trichlorophenoxyethoxyethanol as the essential active ingredient in a concentration of at least 1 part per million.

References Cited in the file of this patent

UNITED STATES PATENTS

| | | |
|---|---|---|
| 2,712,990 | Swezey | July 12, 1955 |
| 3,006,967 | Newcomer et al. | Oct. 31, 1961 |